United States Patent
Delmau et al.

(10) Patent No.: US 6,306,355 B1
(45) Date of Patent: Oct. 23, 2001

(54) METHOD FOR SEPARATING ACTINIDES AND LANTHANIDES BY MEMBRANE TRANSPORT USING A CALIXARENE

(75) Inventors: Laetitia Delmau, Marseilles; Nicole Simon; Jean-François Dozol, both of Pierrevert; Bernard Tournois, Verdon; Christine Roussin-Bouchard, Sisteron, all of (FR); Volker Böhmer, Mainz (DE); Ralf A. Jakobi, Pirmasens (DE); Oliver Mogck, Burgkirchen (DE); Abdi Tunayar, Mendt (DE)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/485,690
(22) PCT Filed: Aug. 24, 1998
(86) PCT No.: PCT/FR98/01840
§ 371 Date: Apr. 19, 2000
§ 102(e) Date: Apr. 19, 2000
(87) PCT Pub. No.: WO99/10087
PCT Pub. Date: Mar. 4, 1999

(30) Foreign Application Priority Data

Aug. 25, 1997 (FR) .................................. 97 10613

(51) Int. Cl.[7] .......................... C22B 60/00; C01F 17/00; C07F 9/02; C07F 9/28
(52) U.S. Cl. .................. 423/9; 423/10; 423/21.5; 210/634; 210/638; 210/643
(58) Field of Search ................ 423/9, 10, 21.5; 210/634, 638, 643

(56) References Cited

U.S. PATENT DOCUMENTS 5,866,087 * 2/1999 Dozol et al. .............................. 423/9
5,886,087 3/1999 Dalla Torre .

FOREIGN PATENT DOCUMENTS

96/23800 * 8/1996 (WO) .
97/17322 * 5/1997 (WO) .

OTHER PUBLICATIONS

Dozol, et al., "Extraction and transport of radioactive . . . " Value Adding Solvent Extr., [Pap. ISEC '96] vol. 2, 1996, no month, pp. 1333–1338.*

Arnaud–Neu, et al., "Calixarenes with diphenylphosphorylacetamide . . . " J. Chem. Soc., Perkin Trans. 2, (6), 1996, no month, 1175–82.*

Delmau, et al., "CMPO substituted calix[4]arenes, extractants . . . " Chem. Commun. (16) 1998, no month, 1627–8.*

* cited by examiner

Primary Examiner—Steven Bos
(74) Attorney, Agent, or Firm—Oblon, Spivak, McClelland Maier & Neustadt, P.C.

(57) ABSTRACT

The invention involves the separation of actinides and lanthanides by membrane transport by means of a calixarene. To this end, a first aqueous solution containing at least one metal from the group of actinides and lanthanides to be separated is placed in the compartment 3 and a second aqueous re-extraction solution such as a $10^{-2}$ mol/L solution of $HNO_3$ is placed in the compartment 5. The membrane 6 is a microporous membrane of which the pores are filled with a liquid organic phase (calixarene and diluent) chosen in order to favour membrane transport of the metal(s) to be separated from compartment 3 to compartment 5.

14 Claims, 2 Drawing Sheets

METHOD FOR SEPARATING ACTINIDES AND LANTHANIDES BY MEMBRANE TRANSPORT USING A CALIXARENE

DESCRIPTION

1. Field of the Invention

This invention involves a process for separation of actinides and lanthanides from an aqueous solution containing them.

Such solutions could be in particular aqueous solutions from used nuclear fuel treatment facilities, such as fuel dissolving solutions or aqueous effluents.

They could also be aqueous solutions from processing of rare earth, thorium and/or uranium ores.

More precisely, it involves separation of such metals by membrane transport by means of calixarenes.

2. State of the Prior Art

Separation of Lanthanides and Actinides

In the former technique, liquid-liquid extraction processes were used to separate lanthanides among themselves by means of organic extractors such as di(2-ethylhexyl) phosphoric acid, amines, quaternary ammonium salts and tributyl phosphate, as described in Engineering Techniques J 6630-1 to J6630-8. The most selective extractor is di(2-ethylhexyl) phosphoric acid, which favours extraction of heavy lanthanides with low ionic radii.

Calixarenes Substituted by Acetamidophosphine Oxide Groups

The use of macrocyclic ligands such as calixarenes was also considered for extraction of actinides and lanthanides present in aqueous solutions as described in document FR-A-2 729 958.

The calixarenes used in this document have the formula:

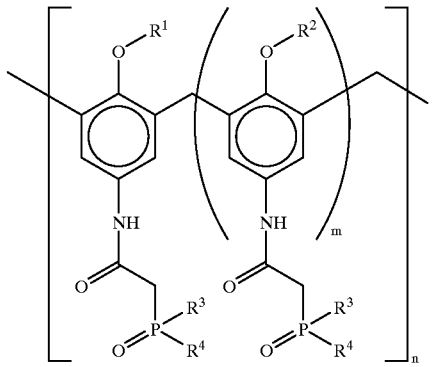

(I)

in which m is equal to 0 or 1, n is a whole number from 2 to 8, with $4 \leq (m+1) \times n \leq 8$ $R^1$ and $R^2$ which can be identical or different, are alkyl or o-nitrophenoxyalkyl groups, and $R^3$ and $R^4$ which can identical or different, are alkyl or aryl groups.

These calixarenes can be used to extract actinides and lanthanides from aqueous solutions from used nuclear fuel processing.

They are functionalised on their upper edges by acetamidophosphine oxide substituents which have good affinity for actinides and lanthanides and they are substituted on the lower edge by alkyl or ortho-nitrophenoxyalkyl groups.

Membrane Transport

These calixarenes can also be used to extract actinides and/or lanthanides by membrane transport through a microporous membrane of which the pores are filled with an organic phase containing the calixarene(s).

In this organic phase, an orthonitrophenyl alkyl ether such as orthonitrophenyl hexyl ether is used as a diluent for the calixarene(s).

With this process, the actinides and/or lanthanides are recovered in a solution containing a complexing agent such as methylene diphosphonic acid.

The use of such a solution presents the drawback of introducing new organic compounds which can hinder the later operations.

Also, the organic phases used do not allow for good separation of actinides and lanthanides from each other from various solutions.

SUMMARY OF THE INVENTION

This invention precisely involves a process for extraction of actinides and lanthanides by membrane transport using a more advantageous re-extraction solution which also allows for separation of actinides and lanthanides from each other from both acid and saline solutions.

According to the invention, the process for separating at least one metal chosen from among the actinides and lanthanides from a first aqueous solution involves putting the aforesaid aqueous solution into contact with one of the sides of a microporous membrane bearing an immiscible organic phase containing at least one calixarene of formula:

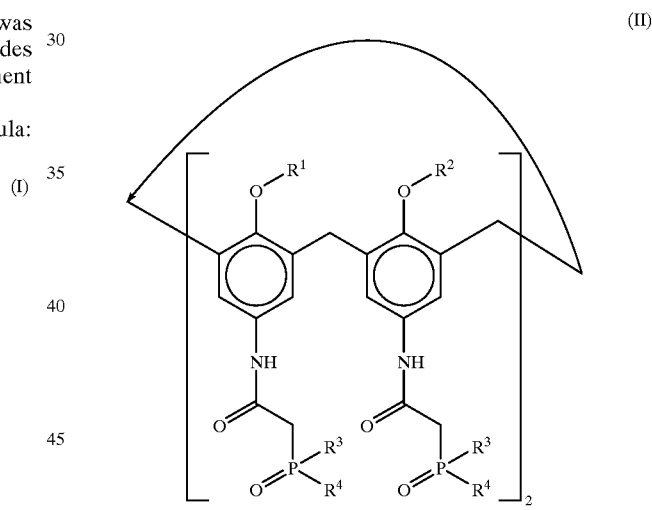

(II)

in which:

$R^1$ and $R^2$ which can be identical or different, are alkyl or o-nitrophenoxyalkyl groups, and $R^3$ and $R^4$ which can identical or different, are aryl groups, and to put the other side of the aforesaid microporous membrane into contact with an aqueous re-extraction solution to transfer the metal(s) of the first aqueous solution into to the second aqueous re-extraction solution, the immiscible organic phase being made of a solution of the aforesaid calixarene(s) in an organic diluent, and the second aqueous re-extraction solution being an aqueous solution of a mineral acid having a pH less than or equal to 4, for example a nitric acid concentration of $10^{-4}$ to $10^{-1}$ mol/L.

The use of an aqueous re-extraction solution made from a mineral acid is very advantageous.

This solution is non-complexing, it does not contain a hindering organic compound, it has a very low mineral acid concentration and it is more economical that the aqueous solutions of complexers used in FR-A-2 729 958.

In this aqueous re-extraction solution, the mineral acid can be in particular nitric acid; in this case, a nitric acid concentration of $10^{-2}$ mol/L is particularly advantageous.

A microporous membrane bearing the immiscible organic phase including at least one calixarene of formula (II) is used for the invention process.

The microporous membrane can be made of a polymer, for example polyethylene, polysulphone, polypropylene, polyvinylidene fluoride or polytetrafluoroethylene. A thin membrane with high porosity and small diameter pores is advantageously used. The membrane is generally 25 to 100 µm thick, for example 25 µm, with a porosity of 45 to 60%, preferably 45%, and an average pore radius from 20 to 1000 nm, preferably about 40 nm. The microporous membrane used could in particular be that marketed under the CELGARD brand name.

According to the invention, the organic diluent used to form the organic phase borne by the microporous membrane is chosen so as to obtain a stable membrane which allows for efficient transport of the metal(s) into the slightly acidic aqueous re-extraction solution.

For this purpose, the diluent must meet the following criteria:

insoluble in water non-volatile, and having a viscosity suitable for transport and a sufficiently high interfacial tension with the aqueous phases, for example at least 4 mN/m.

Appropriate diluents could belong for example to the group of heavy alcohols, having more than 10 carbon atoms and which are insoluble in water, for example 10 to 13 carbon atoms such as isotridecanol, and mixtures of heavy alcohols and alkylbenzenes, for example a mixture of isotridecanol and hexylbenzene. The choice of these organic diluents allows for transport of metals of the lanthanide and actinide groups from a saline or acid solution to an aqueous re-extraction solution.

Nitro phenyl alkyl ethers such as ortho-nitrophenyl hexyl ether can also be used, but in this case a first aqueous saline solution should be used to obtain transport of the actinides and lanthanides into the aqueous re-extraction solution.

In the organic phase, calixarenes selected from those described in FR-A-2 729 958 can be used. Calixarenes of formula (II) in which $R^1$ and $R^2$ represent an alkyl group with $C_5$ to $C_{18}$, and $R^3$ and $R^4$ both represent phenyl groups are preferably used.

The formula below gives an example of the calixarenes which can be used:

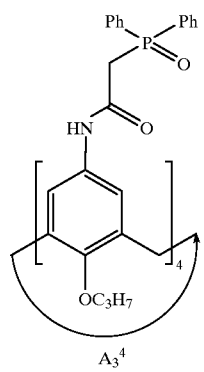

(III)

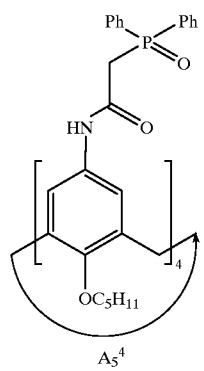

(IV)

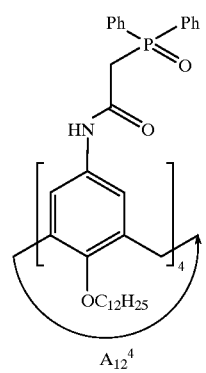

(V)

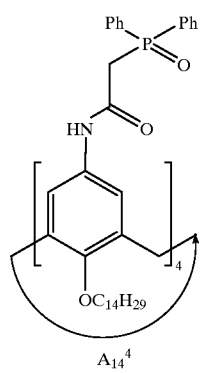

(VI)

in which Ph represents the phenyl group.

The calixarene concentration in the organic phase is chosen so as to obtain good selectivity in transport of the various metals.

Calixarene concentrations of $5 \cdot 10^{-3}$ to $5 \cdot 10^{-4}$ mol/L are generally appropriate.

The microporous membrane bearing the organic liquid phase is prepared by soaking the membrane in a small quantity of the organic phase or solution using, for example, about $1.2 \cdot 10^{-3}$ cm$^3$ of solution per cm$^2$ of membrane, in a low vacuum, for at least 15 minutes. The surplus organic solution is eliminated after this operation.

In order to apply the invention process, the microporous membrane bearing the organic liquid phase can be put in a chamber so as to separate this chamber into two compartments, the first compartment in contact with one of the sides of the membrane containing the first aqueous solution of the metals to be separated and the second compartment in contact with the other side of the membrane containing the second aqueous re-extraction solution.

The invention process can be used to separate actinides and lanthanides from aqueous solutions from in particular processing of spent nuclear fuels, such as generally acidic solutions and aqueous effluents from these facilities which are often saline media. The invention process can also be used to separate rare earth metals from concentrates obtained by lixiviation of rare earth ores.

In applying the invention process, the microporous membranes may be in the form of modules such as ultrafiltration or microfiltration modules, with planar or hollow-fibre membranes, which allow for processing of large quantities of fluids.

It can also be used to separate metals of the lanthanide and actinide groups from each other. In this case, the composition of the organic phase (diluent, calixarene, and calixarene concentration) is chosen so as to obtain high permeability of the membrane for the metal to be separated with respect to the permeability of the membrane to the other metals. The second aqueous re-extraction solution can thus be strongly enriched with this metal. Such enrichment can be increased by doing several successive membrane transport steps, i.e. by subjecting the second re-extraction solution obtained after the first transport to a second membrane transport after adjusting its acidity or salinity if necessary so that the acidity or salinity of this second solution is identical to that of the starting solution.

For example curium can be separated from terbium by using an organic phase made of a solution of formula (II) calixarene in which $R^1$ and $R^2$ represent an alkyl group with C5 to C18, and $R^3$ and $R^4$ represent the phenyl group, in a concentration of $10^{-3}$ mol/L in a mixture of isotridecanol and hexylbenzene.

Other characteristics and advantages of the invention will be clearer with a reading of the following embodiment example, given simply as an illustration and in no way limiting, with reference to the drawings in appendix.

DETAILED DESCRIPTION OF EMBODIMENTS OF THE INVENTION

Figure 1:
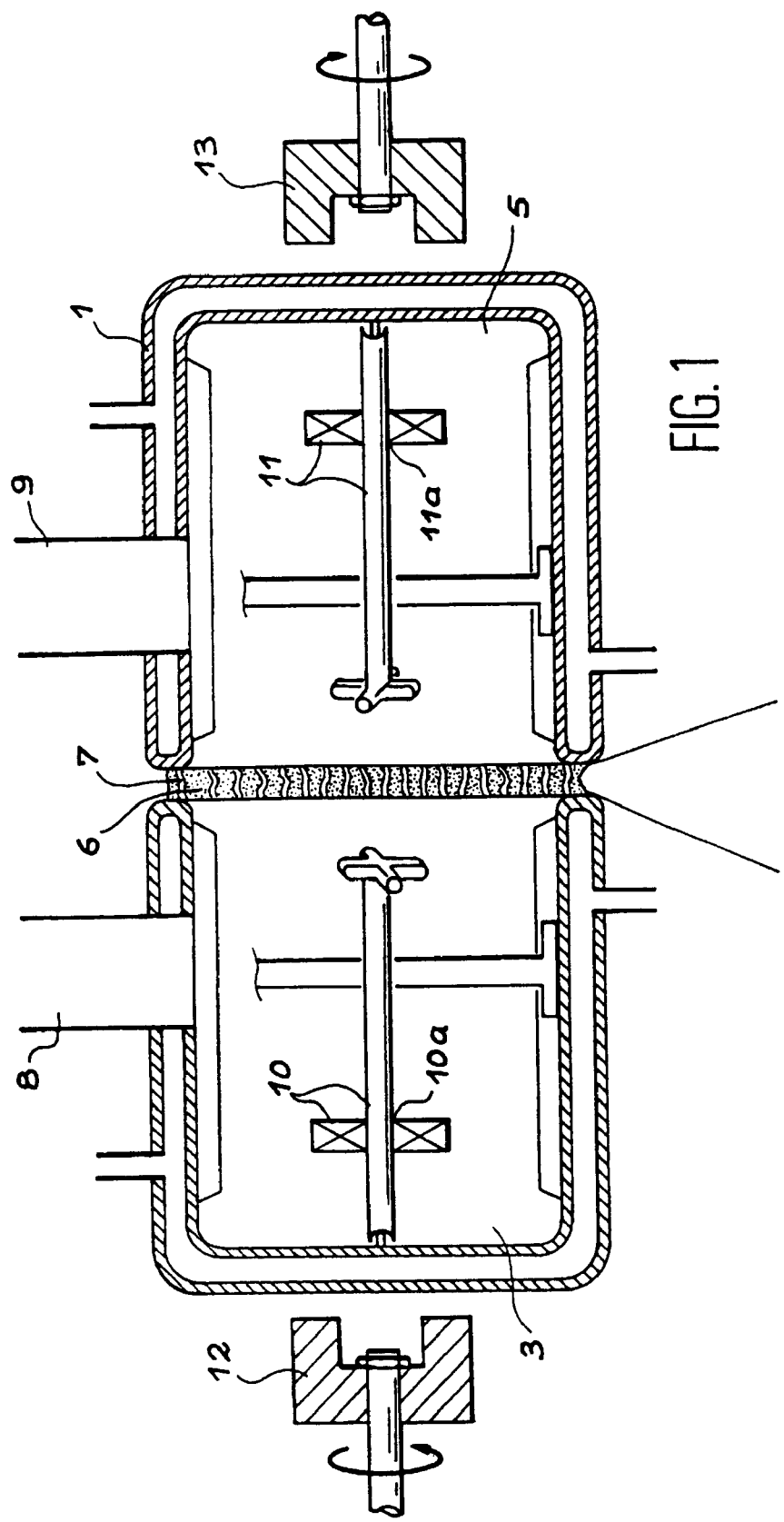
FIG. 1 schematically shows a device for membrane transport which can be used for applying the invention process.

FIG. 1 shows that the device for membrane transport includes a double-wall thermostat-regulated chamber 1, separated into two compartments 3 and 5 by a microporous membrane 6 bearing in its pores the calixarene liquid organic phase 7.

The first aqueous solution of metals to be separated can be introduced in the compartment 3 through the input opening 8, and the aqueous re-extraction solution in the compartment 5 through opening 9. Each compartment is equipped with a magnetic stirrer 10 or 11 including an internal magnet 10a or 11a and an external magnet 12 or 13.

The invention process is applied by putting the starting solution containing the metals to be separated into the compartment 3 and putting into the compartment 5 the re-extraction solution, for example a $10^{-2}$ mol/L aqueous solution of nitric acid. The stirring is turned on in each compartment at a speed of 800 to 1500 rotations/minute, preferably 1000 rotations/minute. In these conditions, the cations are selectively transported from compartment 3 to compartment 5 and the separation can be monitored by determining the concentration C of a cation in compartment 3 at a given time t and concentration C' of the same cation in the solution in compartment 5 at time t.

This gives the equation C=Co−C' where Co is the concentration of the starting solution of this same cation at time t=0. The concentration of a cation M in compartment 3 can be monitored by plotting the curve ln(C/Co)=f(t).

The concentration of a cation M in the re-extraction solution can be monitored by plotting the curve ln(C'/Co)= f(t).

The slope of the curve thus obtained is equal to:

$$a = \frac{Surf * E}{Vol} * P$$

with Area representing the area of the membrane, E representing the porosity factor of the membrane, Vol the volume of the solution in compartments 3 and 5, and P the permeability, the value of the permeability P can thus be determined:

$$P = \frac{a * Vol}{Surf * E}$$

A good separation of the cations is obtained when the associated permeabilities of the cations present in the starting solution are sufficiently different from each other.

The following examples illustrate various embodiments of the invention.

EXAMPLE 1

In this example, a microporous polypropylene membrane with the following characteristics marketed under the name CELGARD is used:

porosity factor: 0.45 pore diameter: 0.04 µm membrane thickness: 25 µm

In this example, the pores of the membrane are filled with a mixture containing 75% isotridecanol and 25% hexylbenzene by volume (75:25 by volume) containing $10^{-3}$ mol/L of $A_{12}^4$ calixarene of formula (V) which was previously given. 50 ml of an aqueous solution made from 4 mol/L of $NaNO_3$ and 0.01 mol/L of $HNO_3$ containing $10^{-6}$ mol/L of a rare earth metal or an actinide group metal is put into compartment 3. Compartment 5 contains 50 ml of a $10^{-2}$ mol/L nitric acid solution.

The solutions are subjected to stirring at 1000 rotations/minutes and the activity of the aqueous re-extraction solution in compartment 5 is determined by liquid scintillation or by α or □ spectrometry as a function of time. From the results obtained, the permeability P of the membrane with respect to the element to be extracted is determined using the formula given above. The permeabilities obtained for Cm, Am, Pm, Eu, Gd and Tb are given in Table 1 in appendix.

This table shows that the permeability of the membrane for curium is very high with respect to its permeability for terbium, thus allowing for good separation of curium and terbium.

EXAMPLE 2

In this example, the same approach as in example 1 is used, but isotridecanol is used as a diluent instead of the isotridecanol-hexylbenzene mixture and with $A_5^4$ calixarene of formula (IV) given above. The results obtained are shown in table 1.

The permeabilities are higher with this diluent than with that of example 1. There is also selectivity of cations.

EXAMPLE 3

In this example, the same approach as in example 1 is used, but ortho-nitro phenyl hexyl ether (NPHE) is used as a diluent instead of the isotridecanol-hexylbenzene mixture, and with $A_{14}^4$ calixarene of formula (VI) given above. The results obtained are shown in table 1.

This table shows that the permeabilities are on the same order as those of example 1 in which an isotridecanol-hexylbenzene mixture was used as a diluent.

EXAMPLE 4

In this example, the same approach as in example 1 is used, but the aqueous starting solution is a 3 mol/L nitric acid solution containing $10^{-6}$ mol/L of the metal to be extracted. The results obtained are shown in table 1. The permeabilities are lower than in example 1, but there is once again selectivity among the metals.

EXAMPLE 5

The same approach as in example 1 is used, but the metal concentration of the starting solution is $10^{-3}$ mol/L instead of $10^{-6}$ mol/L. The results obtained are shown in table 2. They are given in terms of flow or percentage of extraction because the permeabilities are not defined with high metal concentrations (table 2).

In this case, the elements Eu, Gd, Tb are no longer in traces with respect to calixarene, but there is no saturation of the membrane. There is selectivity between the elements.

EXAMPLE 6

Separation of Europium.

In this example, europium is separated from an aqueous solution containing:

$HNO_3$: 1 mol/L
$NaNO_3$: 4 mol/L
Eu: $10^{-6}$ mol/L

The europium is separated by membrane transport using the same microporous membrane as in example 1 and an organic phase composed of a mixture of isotridecanol and hexylbenzene (75:25 in volume) containing $10^{-3}$ mol/L of $A_{14}^4$ calixarene of formula (VI). The second compartment contains a nitric acid solution with $10^{-2}$ mol/L of $HNO_3$.

Figure 2:
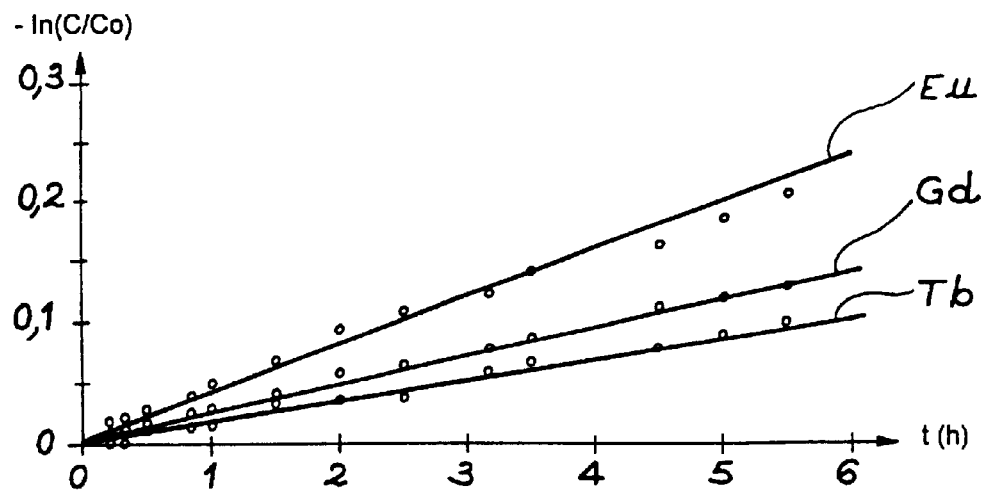
FIG. 2 is a graph illustrating the variation of ln(C/Co) of a metal to be extracted as a function of time (in hours) for Eu, Gd and Tb.

FIG. 2, with the Eu reference curve, illustrates the results obtained in these conditions, i.e. the variation in ln (C/Co) of europium as a function of time (in hours). C is the concentration of europium at time t and Co is the europium concentration in the starting solution.

EXAMPLES 7 AND 8

Separation of Gadolinium and Terbium.

The same approach as in example 6 is used to separate gadolinium and terbium from an aqueous solution of the same composition as that in example 6 containing $10^{-6}$ mol/L of gadolinium or terbium. The results obtained are shown by the Tb (terbium) and Gd (gadolinium) curves in FIG. 2. If we compare the curves in FIG. 2 we see that europium is transported more efficiently than gadolinium and terbium. Separation of these rare earth metals is therefore possible with the invention process.

EXAMPLE 9

Figure 3:
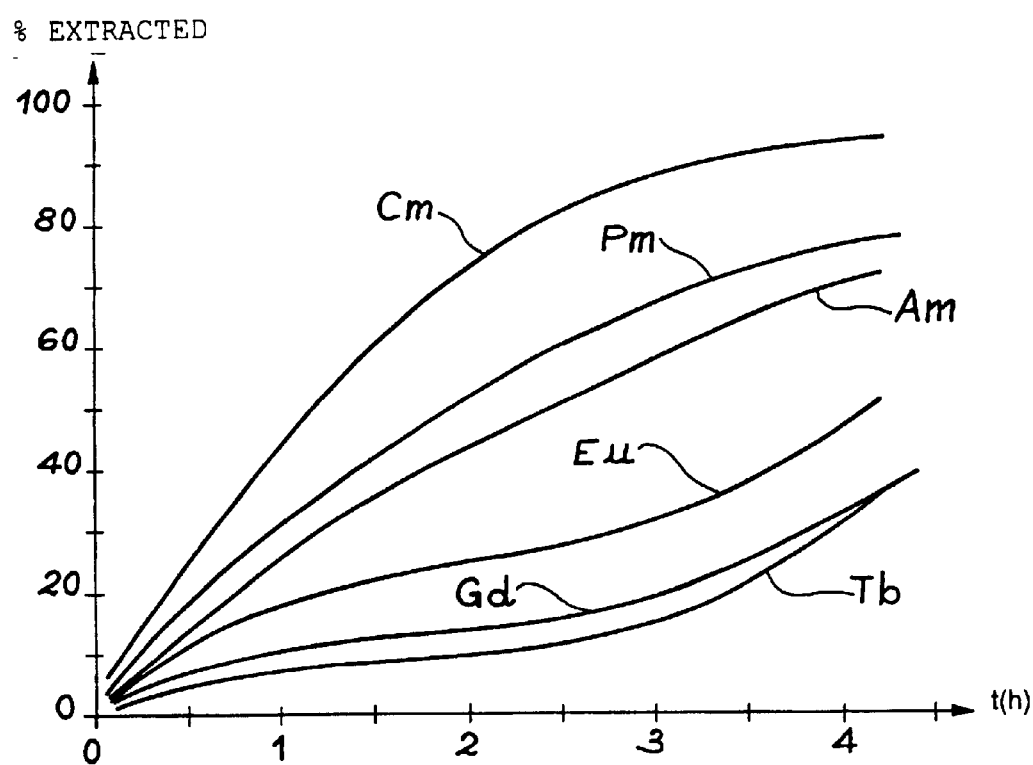
FIG. 3 is a graph showing the changes in quantities of metals extracted (in %) as a function of time (in hours) for Cm, Pm, Am, Eu, Gd and Tb.

In this example, the efficiency of membrane transport for separation of the following metals is evaluated: Pm, Eu, Gd, Tb, Am and Cm present in an aqueous starting solution containing $10^{-6}$ mol/L of each of these lanthanide or actinide nitrates, $10^{-2}$ mol/L of $HNO_3$ and 4 mol/L of $NaNO_3$. The same membrane as in example 1 is used and the organic phase is composed of a mixture of 75% isotridecanol and 25% hexylbenzene by volume containing $10^{-3}$ mol/L of $A_5^4$ calixarene of formula (IV). The re-extraction solution is a $10^{-2}$ mol/L solution of $HNO_3$. The results obtained in these conditions are given in FIG. 3 which shows, for each cation, the percentage of cation extracted as a function of time (in hours).

In this figure we see that Cm, Pm and Am are transported more rapidly than Eu, Gd and Tb cations. An efficient separation of these elements by membrane transport is therefore possible.

After 2.5 hours of transport, the percentages of the cations extracted are as follows:

Pm: 61.3%
Eu: 25.9%
Gd: 13.7%
Tb: 9.0%
Am: 48.1%
Cm: 80.7%

The re-extraction phase thus contains 8.9 times more Cm than Tb. The membrane transport operation is then restarted from this re-extraction phase after addition of sodium nitrate in the quantity needed to establish the same conditions as those of the starting solution, i.e. 4 mol/L of $NaNO_3$. In these conditions, the percentages of cations present in the re-extraction solution obtained after the second membrane transport are, with respect to the first starting solution:

Pm: 37%
Eu: 6.7%
Gd: 1.9%
Tb: 0.8%
Am: 23.1%
Cm: 65.1%

The re-extraction solution obtained after the second membrane transport thus contains 80 times more curium than terbium.

A very large enrichment is thus obtained with the second membrane transport.

TABLE 1

| | | | | | Permeability (cm)h | | | | | |
|---|---|---|---|---|---|---|---|---|---|---|
| Ex. | Start | Diluent | Calixarene | Metal ionic radius (A) | Am 0.975 | Cm 0.970 | Pm 0.970 | Eu 0.947 | Gd 0.938 | Tb 0.923 |
| 1 | Saline medium* | Isotridecanol: 75% Hexylbenzene: 25% | $A^4_{12}$ ($10^{-3}$ mol/L) | Concentration of $10^{-6}$ mol/L | 3.1 | 6.0 | 2.9 | 1.4 | 0.93 | 0.59 |
| 2 | Saline medium* | Isotridecanol | $A^4_5$ ($10^{-2}$ mol/L) | Concentration of $10^{-6}$ mol/L | | | 16.8 | 9.2 | 8.1 | 7.2 |
| 3 | Saline medium* | Orthonitriphenyl hexyl ether | $A^4_{14}$ ($10^{-3}$ mol/L) | Concentration of $10^{-6}$ mol/L | | | 3.0 | 1.8 | 1.1 | 0.78 |
| 4 | $HNO_3$ 3M | Isotridecanol: 75% Hexylbenzene: 25% | $A^4_{12}$ ($10^{-3}$ mol/L) | Concentration of $10^{-6}$ mol/L | 0.27 | 0.15 | 0.2 | 0.12 | 0.086 | 0.064 |

*Saline medium: 4M $NaNO_3$, 0.01 M $HNO_3$.

TABLE 2

| Elements | Pm | Eu | Gd | Tb |
|---|---|---|---|---|
| Flow (mol. $h^{-1}$ $cm^{-2}$) | $5 \cdot 10^{-14}$ | $1,2 \cdot 10^{-8}$ | $8,5 \cdot 10^{-9}$ | $6,3 \cdot 10^{-9}$ |
| % transported in 3 days | 15% | 8.4% | 6.0% | 4.3% |

What is claimed is:

1. A process for separating at least one metal selected from the group consisting of the actinides and lanthanides from a first aqueous solution, comprising:

contacting said first aqueous solution with one of the sides of a microporous membrane bearing an immiscible organic phase containing at least one calixarene of formula:

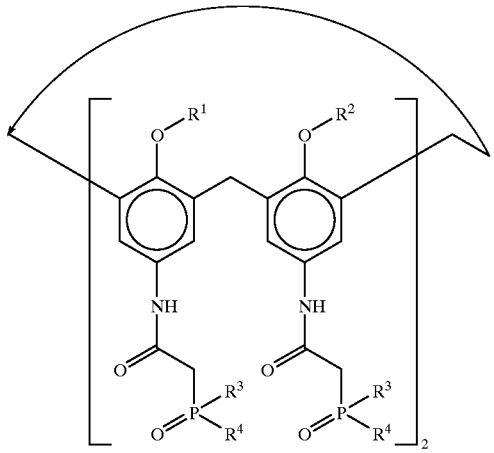

wherein
$R^1$ and $R^2$, which may be the same or different, are alkyl or o-nitrophenoxyalkyl groups, and
$R^3$ and $R^4$, which may be the same or different, are aryl groups, and the other side of said microporous membrane is contacted with an aqueous re-extraction solution to transfer the metal(s) of the first aqueous solution into a second aqueous re-extraction solution,
wherein said immiscible organic phase comprises a solution of said calixarene(s) in an organic diluent, and the second aqueous re-extraction solution contains a mineral acid and has a pH less than or equal to 4.

2. The process according to claim 1, wherein said second aqueous re-extraction solution is an aqueous solution of a mineral acid with an acid concentration of $10^{-4}$ to $10^{-1}$ mol/L.

3. The process according to claim 2, wherein said acid is nitric acid.

4. The process according to claim 1, wherein said organic diluent is a heavy alcohol or a mixture of a heavy alcohol and alkylbenzene.

5. The process according to claim 4, wherein said diluent is isotridecanol or a mixture of isotridecanol and hexylbenzene.

6. The process according to claim 1, wherein said organic diluent is ortho-nitrophenylhexyl ether and said first aqueous solution is a saline solution.

7. The process according to claim 3, wherein said organic diluent is ortho-nitrophenylhexyl ether and said first aqueous solution is a saline solution.

8. The process according to claim 1, wherein the concentration of calixarene(s) in the organic phase is $5 \cdot 10^{-4}$ mol/L to $5 \cdot 10^{-3}$ mol/L.

9. The process according to claim 1, wherein $R^1$ and $R^2$ represent an alkyl group with having 5 to 18 carbon atoms and $R^3$ and $R^4$ represent the phenyl group.

10. The process according to claim 1, wherein said first aqueous solution is an acid or saline solution.

11. The process according to claim 4, wherein said first aqueous solution is an acid or saline solution.

12. The process according to claim 5, wherein said first aqueous solution is an acid or saline solution.

13. The process according to claim 1, for separating at least one metal of the group of lanthanides and actinides from at least one other metal of this group, in which the diluent calixarene and calixarene concentration of the organic phase are chosen to obtain a permeability of the membrane with respect to the metal(s) to be separated which is higher than that of the other metal(s).

14. The process according to claim 13, in which the metal to be separated is curium, the other metal is terbium and the organic phase is a solution of formula (II) calixarene, in which $R^1$ and $R^2$ represent an alkyl group having 5 to 18 carbon atoms and $R^3$ and $R^4$ represent the phenyl group, with a concentration of $10^{-4}$ to $5 \cdot 10^{-3}$ mol/L in a mixture of isotridecanol and hexyl benzene.

* * * * *